Dec. 9, 1930.  J. H. KERBER  1,784,144
MATERIAL HANDLING APPARATUS
Filed March 7, 1930  2 Sheets-Sheet 1

Inventor
Joseph H. Kerber
By
Louis O. French
Attorney

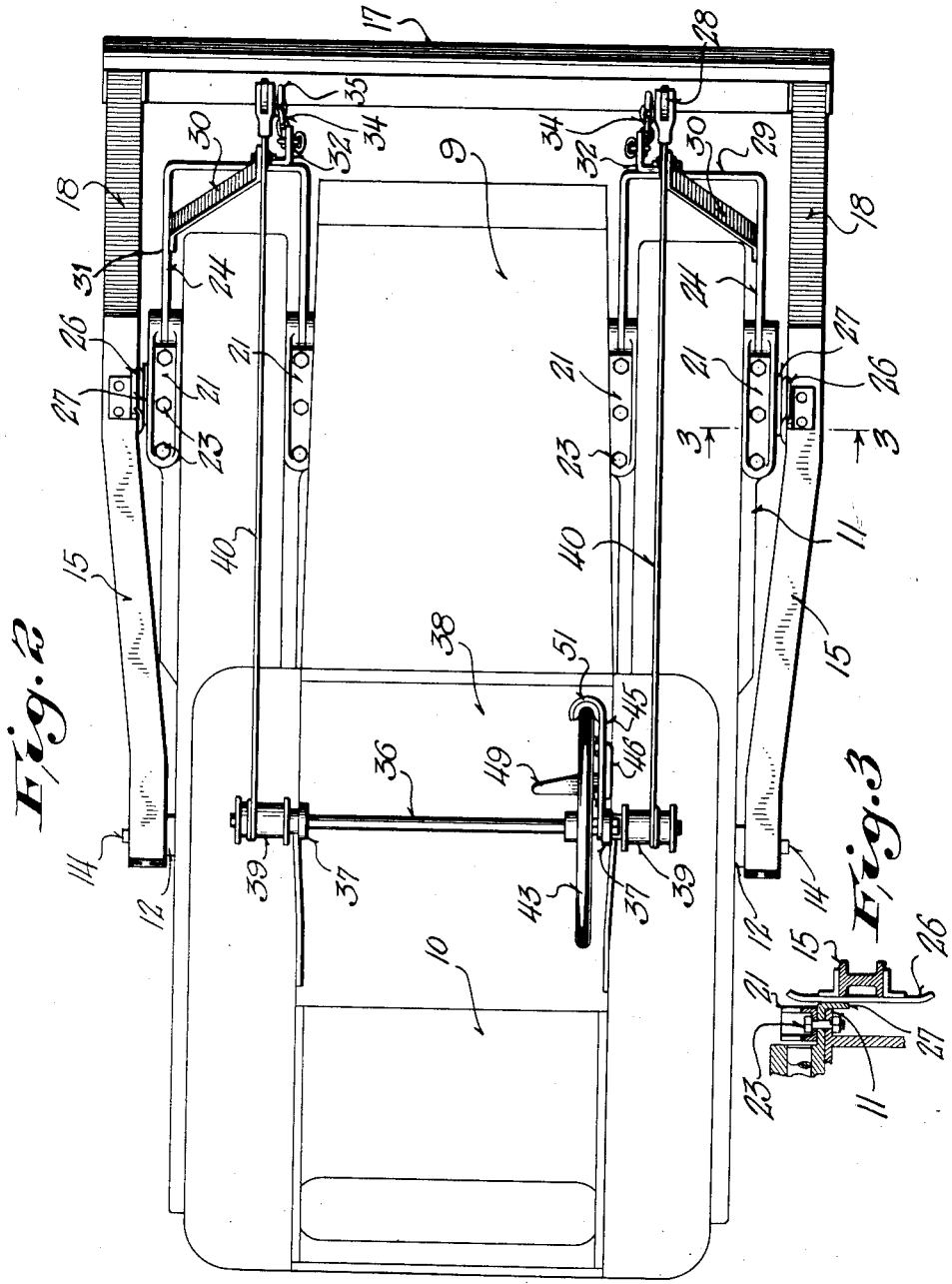

Patented Dec. 9, 1930

1,784,144

UNITED STATES PATENT OFFICE

JOSEPH H. KERBER, OF WEST ALLIS, WISCONSIN, ASSIGNOR TO HI-WAY SERVICE CORPORATION, OF MILWAUKEE, WISCONSIN, A CORPORATION OF WISCONSIN

MATERIAL-HANDLING APPARATUS

Application filed March 7, 1930. Serial No. 433,973.

The invention relates to material-handling apparatus and more particularly those forms of apparatus employing scraper blades such as used as bulldozers, back-fillers and snow-plows.

The object of the invention is to provide a supporting frame for the scraper blades, adapting it for mounting to tractors, more particularly of the endless tread propelled type, and in a manner not to interfere with the use of the rear drawbar and so as to prevent undue strains to the tread frames and the anchorage of the supporting frame and an efficient distribution of the load strains to the tread frames and to provide a simple means for raising or lowering the blade-supporting frame according to the conditions of the work, with a control means readily accessible to and easily operated by the driver of the tractor.

The invention further consists in the several features hereinafter set forth and more particularly defined by claims at the conclusion hereof.

In the drawings Fig. 1 is a side elevation view of an apparatus embodying the invention, parts being broken away and parts being shown in section;

Fig. 2 is a plan view of the apparatus;

Fig. 3 is a detail sectional view taken on the line 3—3 of Fig. 2.

Figure 1:
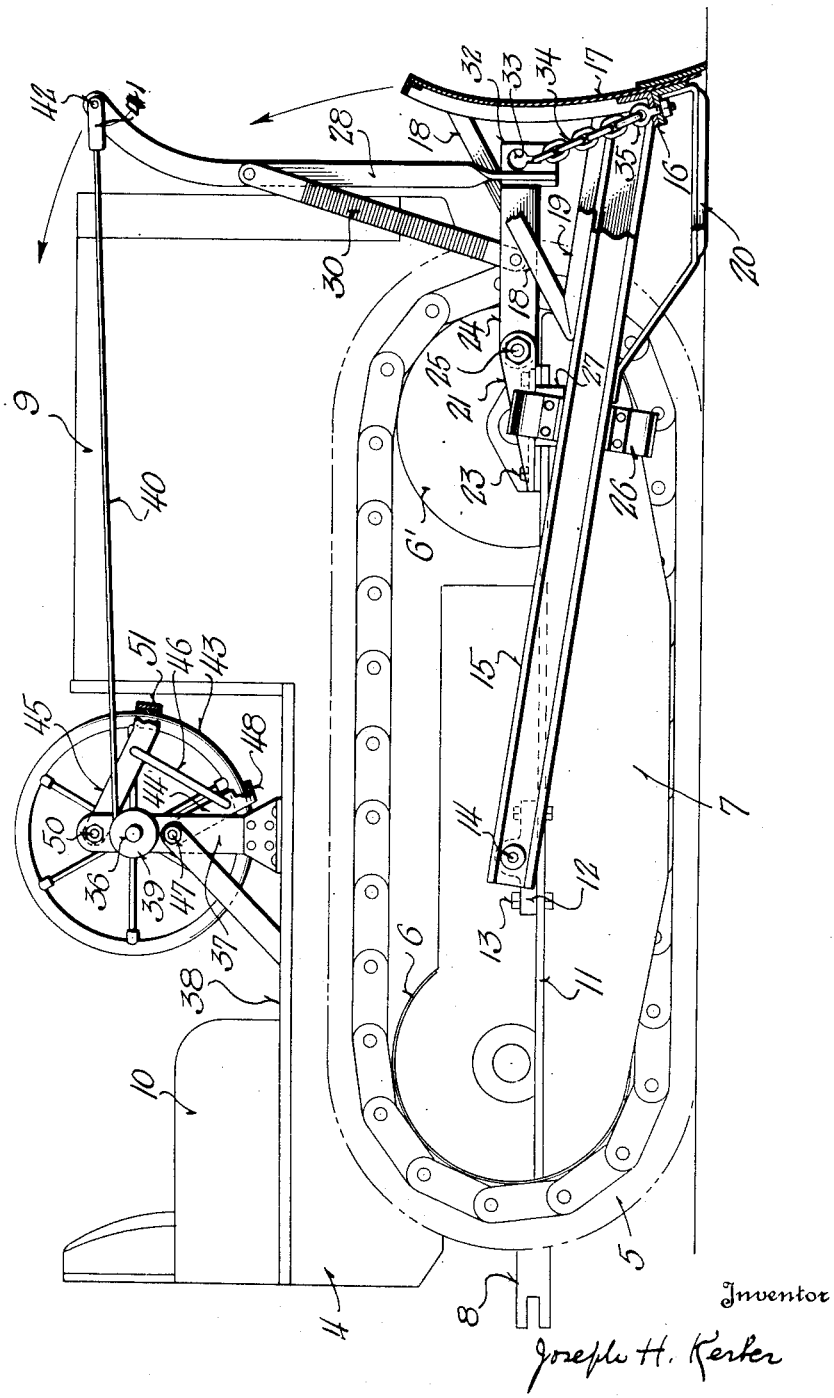

In the drawings the numeral 4 designates a tractor of known construction of the full crawler type having endless propelling treads 5 running over sprockets 6 and 6', here shown conventionally, at the front and rear portions of the tractor and over the usual truck or tread rollers (not shown) mounted in the truck or tread frames 7, and 8 the usual drawbar at the rear end of the tractor. As is usual, the rear sprockets 6 are driven from the engine housed in the housing 9 through a suitable transmission (not shown) and under the control of the operator or driver of the tractor from his seat 10, these controls not being specifically shown.

The truck frames 7 include frame members having laterally extending flanges 11 to which pivot-supporting brackets 12 are secured by bolts 13, said brackets having pivot pins 14 mounted therein upon which the side frame members 15 of the implement or blade-supporting frame are pivotally mounted. This supporting frame also includes a transverse frame member 16 connecting the front ends of the members 15 together and in the present example, illustrating a bulldozer, connected directly to the scraper blade 17, though for back fillers and snowplows the blade is connected to this frame in any suitable manner known to this art. The blade 17 is also braced at its upper portion by angular, heavy metal braces 18 connected at spaced points to the blade and with one of the legs 19 abutting the frame member 15, while shoes 20 are connected to said frame members 15 and the lower portion of the blade.

Spaced pairs of brackets 21 are secured to the truck frames 7 and the flanges 11 thereof by bolts 23 and U-shaped members 24 straddle the front ends of the truck frames 7 and are pivotally connected to each set of brackets by pivot bolts 25.

The side frame members 15 preferably carry plates 26 which cooperate with similar plates 27 on the trucks depending from the brackets 21 to keep the sides of the supporting frame in proper alinement.

Each member 24 forms part of a hoisting frame which also includes an upright frame member 28 secured at its lower end, as by riveting, to the yoke or transverse portion 29 of the member 24 and braced by a member 30 secured at its lower end to the outer side or leg 31 of the member 24 and at its upper end to the medial portion of the member 28. An angle iron bracket 32 is also secured to the part 29 by the rivets or other means securing the member 28 thereto and is provided with a chain-securing slot 33 by which a chain 34 may be adjustably anchored to the hoisting frame, the chain being secured at its other end to an eyebolt 35 secured to the blade-carrying frame. By varying the effective length of the chains the blade-supporting frame may be lowered to permit the blade carried thereby to be lowered below the plane of the bottom run of the treads or above the same, as desired. Furthermore, these chains provide flexible connections between the hoisting frames and the implement-carrying frame, permitting relative movement therebetween.

A shaft 36 is journalled in suitably braced brackets 37 mounted on the operating platform 38 of the tractor adjacent the driver's seat 10 and carries hoisting drums 39 at its ends. A cable 40 is anchored to each drum and extends therefrom to a cable coupling 41 which has forked ends straddling the upper end of the frame member 28 and pivotally connected thereto by pins 42.

From the foregoing description it will be noted that since the blade-carrying frame is connected to the hoisting frames by the chains 34 and these frames are each connected by a cable 40 with shaft 36, that turning said shaft in the proper direction will raise or lower the blade-supporting frame.

The shaft 36 is readily manipulated by the driver from his position on the seat 10 by means of a handwheel 43 and means are provided for readily controlling the shaft 36 so as to permit the blade-supporting frame being held in various positions of adjustment or being gradually lowered. As shown, I have provided a pair of brake members 44 and 45, preferably operatively connected by a link 46. The brake member 44 is pivotally mounted at 47 on the bracket 37 adjacent the handwheel 43 and has a lateral extending part 48 engageable with said wheel and also provided with a foot-operated pedal extension 49. The brake member 45 is pivotally mounted at 50 on the bracket 37 adjacent the handwheel and has a laterally extending brake shoe portion 51 engageable with said handwheel.

In the operation of the control means, the tendency of the weight of the parts acting through the cables 40 and the drums 39 is to rotate the shaft 36 in a clockwise direction and as the shoe 51 engages the handwheel below its center this action automatically sets the brake 45 and prevents rotation of the shaft 36 and thus holds the parts associated therewith against movement. Turning of the wheel 43 and hence the shaft 36 by the operator, in a counterclockwise direction as in raising the blade through the connections previously described, acts to release the brake 45 to permit this movement. Release of the brake 45 is also effected by the operator pushing forwardly on the pedal 49 to a limited extent and braking is also effected by the brake 44 through the further upward movement of the brake 44 into braking engagement with the wheel 43 by the further outward movement of the pedal 49 by the operator. Thus the shaft 36 is under the ready control of the operator in raising or lowering the blade-supporting frame and is held in any desired position of adjustment. While the above described control is the preferred arrangement for controlling the shaft 36, other arrangements may be employed and I, therefore, do not wish to be limited to the details of construction above described or other details except as the same are specifically set forth in the appended claims.

What I claim as my invention is:

1. An attachment for tractors of the endless tread propelled type comprising an implement-carrying frame, means for pivotally connecting said frame to the tread frames of the tractor, means for raising and lowering said frame including hoisting frames operatively connected with said carrying frame, means for pivotally connecting said hoisting frames to the tread frames of the tractor, and means under the control of the operator for raising and lowering said hoisting frames.

2. An attachment for tractors of the endless tread propelled type comprising an implement-carrying frame, means for pivotally connecting said frame to the tread frames of the tractor, means for raising and lowering said frame including hoisting frames, flexible connections between said carrying frame and each hoisting frame, means for pivotally connecting said hoisting frames to the tread frames of the tractor, and means, under the control of the operator, for raising and lowering said hoisting frames.

3. An attachment for tractors of the endless tread propelled type comprising an implement-carrying frame, means for pivotally connecting said frame to the tread frames of the tractor, means for raising and lowering said frame including hoisting frames adjustably connected with said carrying frame, means for pivotally connecting said hoisting frames to the tread frames of the tractor, an operating shaft, hoisting drums associated with said shaft, hoisting cables connecting said drums with said hoisting frames, and means for controlling the operation of said shaft.

4. An attachment for tractors of the endless tread propelled type comprising an implement-carrying frame, means for pivotally connecting said frame to the tread frames of the tractor, means for raising and lowering said frame including hoisting frames, adjustable flexible connections between said carrying frame and the hoisting frames, means for pivotally connecting each hoisting frame to a tread frame of the tractor on opposite sides of the front end portion thereof, and means, under the control of the operator, for raising and lowering said hoisting frames.

5. An attachment for tractors of the endless tread propelled type comprising an implement-carrying frame, means for pivotally connecting said frame to the tread frames of the tractor, means for raising and lowering said frame including hoisting frames, chains forming adjustable connections between said carrying frame and said hoisting frames, means for pivotally connecting each hoisting frame to a tread frame of the tractor on opposite sides of the front end portion thereof, an operating shaft, hoisting drums operatively connected with said shaft, hoisting cables connecting said drums with said hoisting frames, and means for controlling the operation of said shaft.

6. An attachment for tractors of the endless tread propelled type comprising an implement-carrying frame, means for pivotally connecting said frame to the tread frames of the tractor, means for raising and lowering said frame including hoisting frames operatively connected with said carrying frame, means for pivotally mounting said hoisting frames on the tread frames of the tractor, a hoisting shaft, connections between said shaft and each of said hoisting frames, control means for said shaft comprising a brake to hold said shaft, and means under the control of the operator for releasing said brake.

7. An attachment for tractors of the endless tread propelled type comprising an implement-carrying frame, means for pivotally connecting said frame to the tread frame of the tractor, means for raising and lowering said frame including hoisting frames operatively connected with said carrying frame, means for pivotally mounting said hoisting frames on the tread frames of the tractor, a hoisting shaft, connections between said shaft and each of said hoisting frames, a holding brake and a retarding brake, means operatively connecting said brakes together to permit release of the holding brake and application of the retarding brake, and manually-operated means for controlling said brakes.

In testimony whereof, I affix my signature.
JOSEPH H. KERBER.